US011833930B2

(12) United States Patent
Ormerod

(10) Patent No.: US 11,833,930 B2
(45) Date of Patent: Dec. 5, 2023

(54) SEAT BACKREST INERTIAL LOCKING SYSTEM

(71) Applicant: Textron Aviation Inc., Wichita, KS (US)

(72) Inventor: Sean Michael Ormerod, Wichita, KS (US)

(73) Assignee: Textron Innovations Inc., Providence, RI (US)

(*) Notice: Subject to any disclaimer, the term of this patent is extended or adjusted under 35 U.S.C. 154(b) by 35 days.

(21) Appl. No.: 17/736,681

(22) Filed: May 4, 2022

(65) Prior Publication Data
US 2022/0363171 A1    Nov. 17, 2022

Related U.S. Application Data

(60) Provisional application No. 63/187,155, filed on May 11, 2021.

(51) Int. Cl.
*B60N 2/20* (2006.01)
*B60N 2/433* (2006.01)
*B60N 2/22* (2006.01)
*B60N 2/90* (2018.01)

(52) U.S. Cl.
CPC .............. *B60N 2/433* (2013.01); *B60N 2/20* (2013.01); *B60N 2/2227* (2013.01); *B60N 2/938* (2018.02)

(58) Field of Classification Search
CPC ...... B60N 2/43; B60N 2/2227; B60N 2/2254; B60N 2/1889; B60N 2/168; B60N 2/938
See application file for complete search history.

(56) References Cited

U.S. PATENT DOCUMENTS

| | | | |
|---|---|---|---|
| 3,356,415 A * | 12/1967 | Putsch | B60N 2/2227 297/378.12 |
| 4,225,178 A | 9/1980 | Takada | |
| 5,593,210 A * | 1/1997 | Schwarzbich | F16H 31/001 192/223.2 |
| 6,478,256 B1 | 11/2002 | Williamson | |
| 6,561,584 B1 * | 5/2003 | Schwarz | B60N 2/433 297/367 R |
| 8,757,714 B2 * | 6/2014 | Ward | B60N 2/231 297/216.13 |
| 10,059,235 B2 | 8/2018 | Piaulet et al. | |
| 10,647,226 B2 | 5/2020 | Lindsay et al. | |
| 10,994,644 B2 | 5/2021 | Suhre | |
| 2004/0245816 A1 * | 12/2004 | Nock | B60N 2/2352 297/367 R |
| 2020/0164776 A1 | 5/2020 | Nock et al. | |
| 2022/0111778 A1 * | 4/2022 | Pabalate | B60N 2/757 |

* cited by examiner

Primary Examiner — Syed A Islam
(74) Attorney, Agent, or Firm — Avek IP, LLC

(57) ABSTRACT

A seat backrest inertial locking system configured to lock a seat backrest in place upon rapid acceleration or deceleration of a vehicle. The locking system includes an inertial mass located on an actuation ring, the inertial mass configured to cause rotation of the actuation ring when a rapid acceleration or deceleration is experienced. Rotation of the actuation ring causes longitudinal movement of a locking member into a receiving slot disposed on a truss of the seat backrest, thereby locking the seat backrest in place.

20 Claims, 7 Drawing Sheets

SEAT BACKREST INERTIAL LOCKING SYSTEM

CROSS-REFERENCE TO RELATED APPLICATIONS

This application claims the benefit of U.S. Provisional Application No. 63/187,155 entitled "Seat Backrest Inertial Locking System" and filed on May 11, 2021, which is herein incorporated by reference in its entirety.

BACKGROUND

1. Field of the Disclosure

Embodiments of this disclosure relate generally to the field of seat locking mechanisms. More specifically, embodiments of this disclosure include inertially activated seat locking mechanisms.

2. Description of the Related Art

Many different types of locking mechanisms for use on aircraft seats or vehicle seats have been described in the prior art. For example, commonly assigned U.S. Pat. No. 8,757,714 to Ward et al. discloses a motion sensing seat lock that uses a rotating hub actuated with a ballast to extend a locking member outside of the hub for locking a seat backrest to a seat base. U.S. Pat. No. 4,225,178 to Takada discloses a seat frame that locks upon collision. U.S. Pat. No. 10,059,235 to Piaulet et al. discloses a seat locking device that locks in the case of an abrupt acceleration during impact. Additional prior art disclosing seatback adjustment and braking systems include U.S. Pat. No. 6,478,256 to Williamson, U.S. Patent Application Publication No. 2020/0164776 to Nock et al., U.S. Pat. No. 10,994,644 to Suhre, and U.S. Pat. No. 10,647,226 to Lindsay et al.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some aspects, the techniques described herein relate to an inertial locking system for a seat backrest, including: an actuator ring rotatably coupled to a seat base, the actuator ring including: an arm outwardly extending from the actuator ring; and a track outwardly extending from the actuator ring, the track having a lower rail and an upper rail forming a groove therebetween; an inertial mass mechanically coupled to the arm, the inertial mass configured for moving in a forward direction and an aft direction for rotating the actuator ring; a locking member slidably coupled to the track; and a receiving slot mounted in an opening of a truss of the seat backrest, the receiving slot configured for receiving the locking member when the actuator ring is actuated via movement of the inertial mass for locking the seat backrest to the seat base.

In some aspects, the techniques described herein relate to a seat of a vehicle having a seat backrest inertial locking system configured for locking a seat backrest of the seat in a locked position, the system including: a pivot tube operatively connected to the seat backrest via a first bracket; an actuator ring rotatably coupled to a seat base and receiving a lug of the first bracket, the lug being rotatable therein; an inertial mass mechanically coupled to the actuator ring, wherein movement of the inertial mass in a forward direction or an aft direction causes rotation of the actuator ring; a locking member operatively coupled to the actuator ring via a pin, the locking member being longitudinally actuated by rotation of the actuator ring; and a receiving slot disposed on a portion of the seat backrest, the receiving slot configured for receiving the locking member when longitudinally actuated.

In some aspects, the techniques described herein relate to a seat of a vehicle having an unlocked position and a locked position, the seat including: a seat base mechanically coupled to the vehicle; a seat backrest rotatably connected to the seat base via a pivot tube; and a seat backrest inertial locking system configured to prevent rotation of the seat backrest about the pivot tube when actuated, the system including: an actuator ring receiving a boss extending from the seat base, the actuator ring being rotatable therearound, wherein the actuator ring includes an arm and a track extending outwardly therefrom; an elastic member operatively connected to the arm of the actuator ring at a first end and the seat base at a second end; a locking member slidably coupled to the track of the actuator ring, wherein rotation of the actuator ring about the boss causes longitudinal movement of the locking member into a portion of the seat backrest, thereby placing the seat in the locked position.

BRIEF DESCRIPTION OF THE DRAWINGS

Illustrative embodiments of the present disclosure are described in detail below with reference to the attached drawing figures, which are incorporated by reference herein and wherein.

Figure 1:
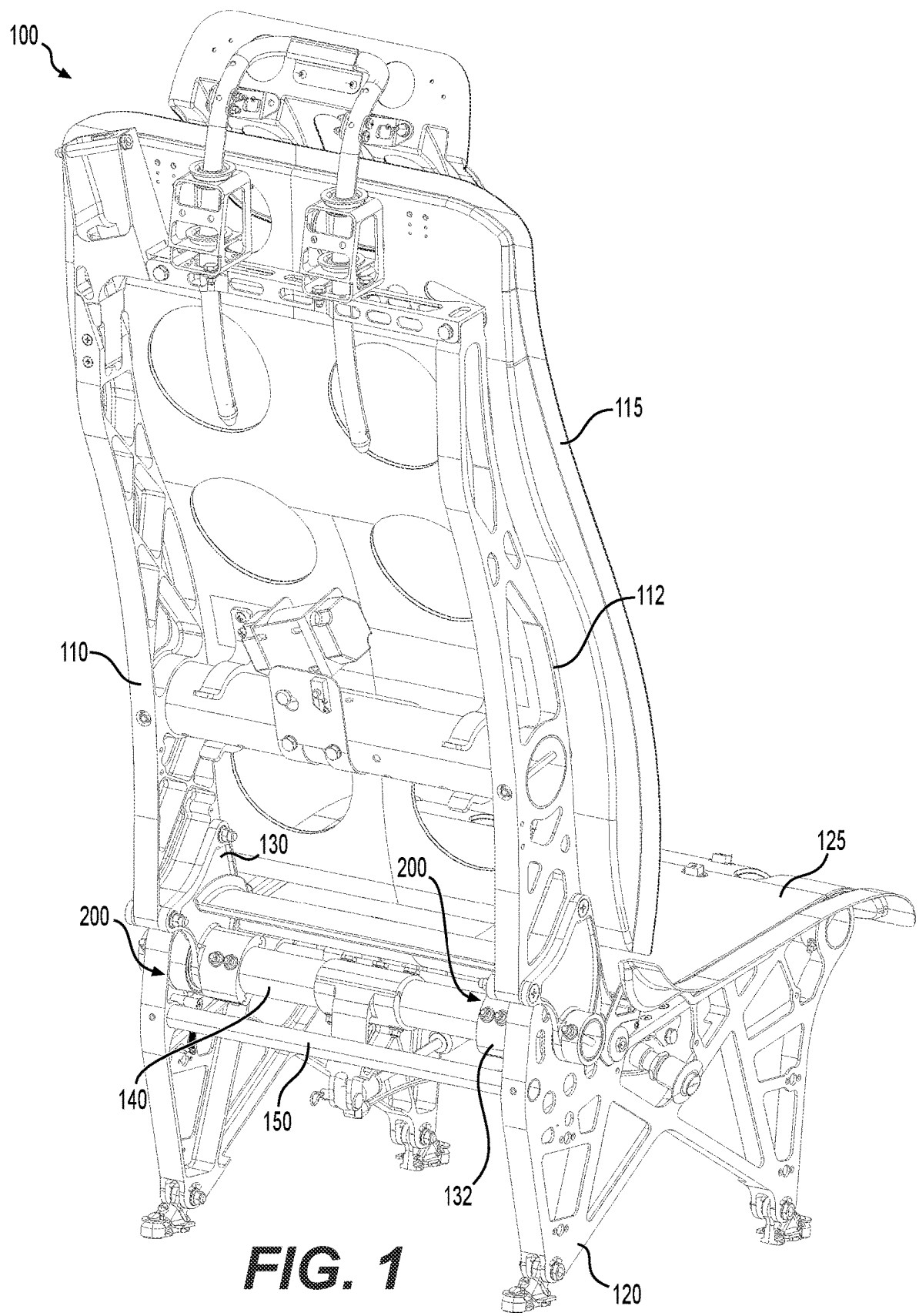
FIG. 1 shows a rear perspective view of a seat having a seat backrest inertial locking system, in an embodiment.

The drawing figures do not limit the invention to the specific embodiments disclosed and described herein. The drawings are not necessarily to scale, emphasis instead being placed upon clearly illustrating the principles of the disclosure.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

FIG. 1 shows a rear perspective view of an exemplary seat 100. Seat 100 may be used onboard an aircraft or other vehicle (e.g., motor vehicle, electric vehicle, etc.). Many components of seat 100 (e.g., cushions, upholstery, armrests, etc.) have been removed to provide a view of underlying features. A seat pan 125 provides a seating surface, and a seat backrest 115 provides a surface for leaning against. A seat base 120 provides a supporting structure upon which seat pan 125 and other components are mounted. Seat base 120 may be mounted to a floor via rails or other mounting features for securing onboard the aircraft/vehicle. Seat backrest 115 is mounted to and supported by a first truss 110 and a second truss 112. First and second trusses 110, 112 are made of aluminum or an aluminum alloy and pivotally coupled to a pivot tube 140, as further described below.

A first bracket 130 mounts to first truss 110, and a second bracket 132 mounts to second truss 112. First bracket 130 includes a collar 135 configured to form a cylindrical through-hole for receiving pivot tube 140 (see FIG. 2). First bracket 130 is mechanically coupled to first truss 110 (e.g., via bolts) and collar 135 is mechanically coupled to pivot tube 140 (e.g., via bolts) such that first bracket 130 couples first truss 110 to pivot tube 140 via collar 135. Second bracket 132 similarly includes a collar, which is partially visible in FIG. 1, that is mechanically coupled to pivot tube 140. Pivot tube 140 is rotatable, which enables pivoting of seat backrest 115 between upright and reclined orientations. In some embodiments, seat base 120 includes a support member 150 that extends transversely between opposing sides of seat base 120, as depicted in FIG. 1.

Partially visible in FIG. 1 below first truss 110 is a seat backrest inertial locking system 200 configured for locking first truss 110. System 200 is configured for mounting to seat 100 for automatically locking seat backrest 115 in the event of a rapid acceleration or deceleration of the aircraft/vehicle. Although not visible in FIG. 1, seat 100 may include a second seat backrest inertial locking system 200 located below second truss 112 for locking second truss 112 to seat backrest 115. In embodiments, the pair of seat backrest inertial locking systems 200 are configured to automatically lock seat backrest 115 via first truss 110 and second truss 112 as further described below.

Figure 2:
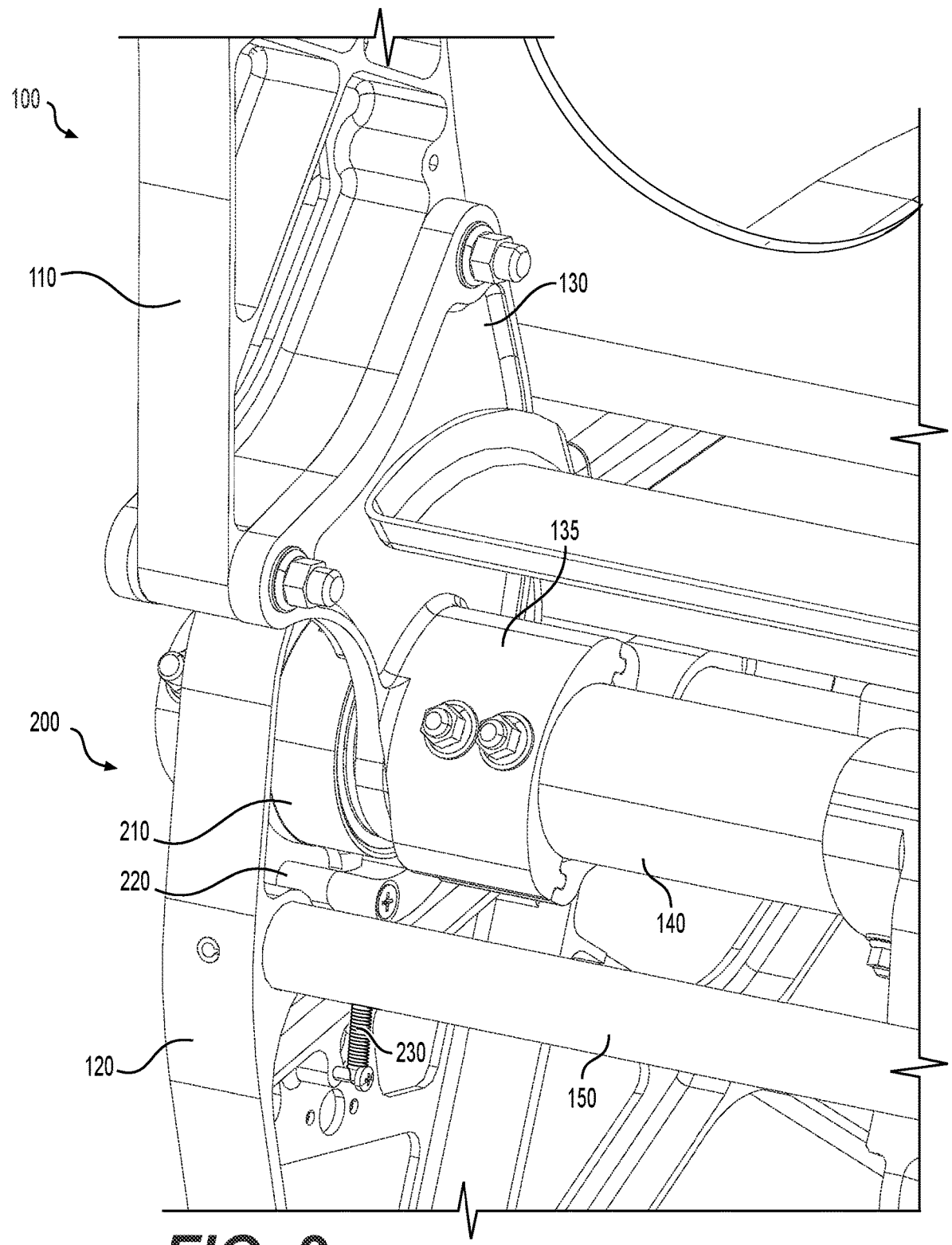
FIG. 2 shows a close-up of the rear perspective view of FIG. 1 in which the seat backrest inertial locking system is partially visible.

FIG. 2 shows a close-up of the rear perspective view of FIG. 1 in which seat backrest inertial locking system 200 is partially visible beneath first truss 110. As depicted in FIG. 2, first bracket 130 and support member 150 partially obstruct the view of seat backrest inertial locking system 200. System 200 includes an actuator ring 210, an inertial mass 220, and an elastic member 230, which are further described below in connection with FIGS. 4-7.

Figure 3:
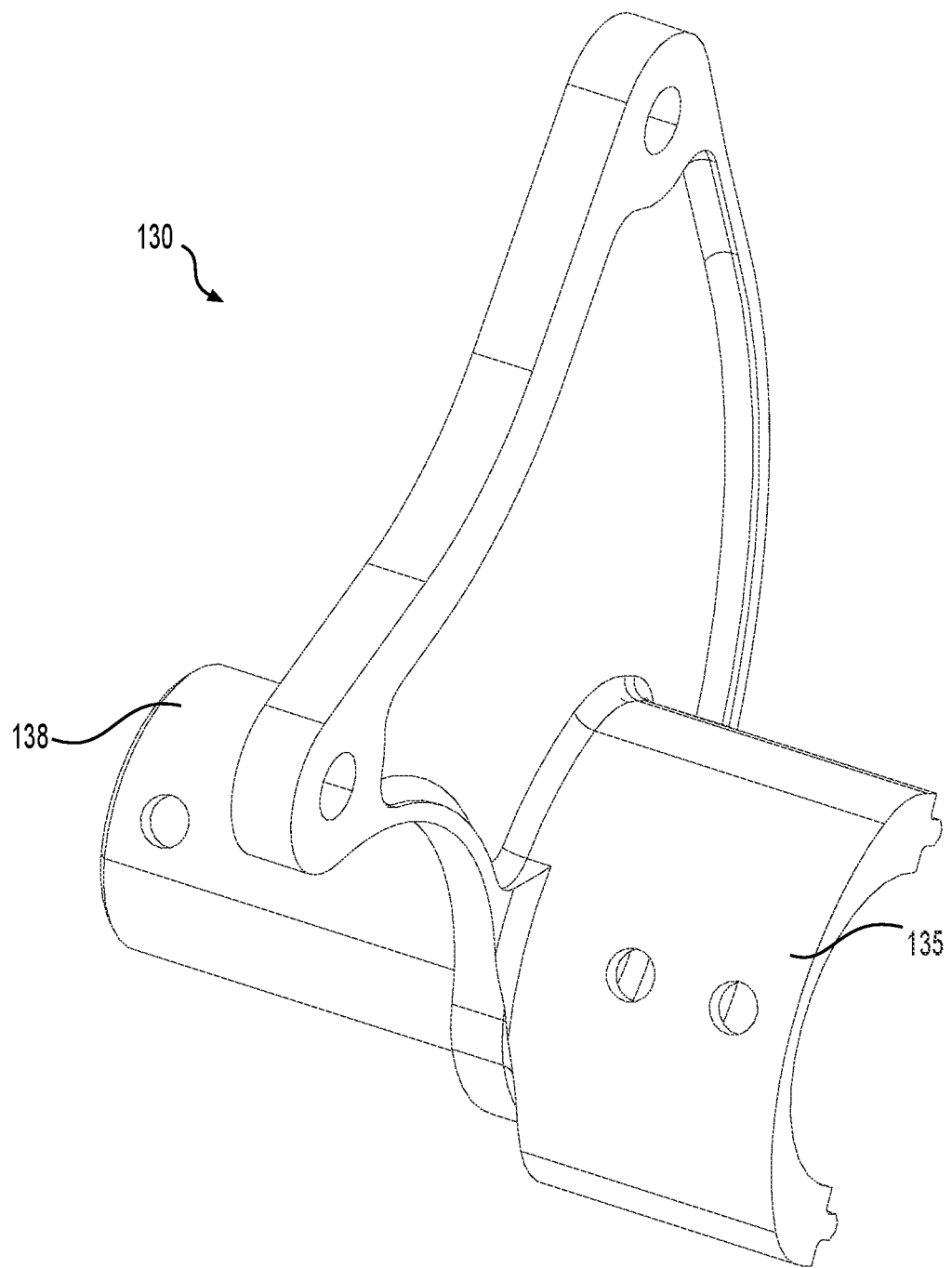
FIG. 3 shows a perspective view of a bracket used in the seat of FIG. 1.

FIG. 3 shows a perspective view of first bracket 130 used in seat 100 of FIGS. 1 and 2. First bracket 130 includes a lug 138 configured for insertion into the central through-hole of actuator ring 210 and into a through-hole of first truss 110, which is partially visible in FIGS. 4 and 7. In an embodiment, first bracket 130 is a machined aluminum or aluminum-alloy part that includes lug 138 and collar 135. Lug 138 is configured to pivotally couple pivot tube 140 with first truss 110. Rotation of lug 138 and pivot tube 140 is independent of rotation of actuator ring 210. Second bracket 132 of FIG. 1 similarly includes a lug (not shown) for pivotally coupling pivot tube 140 with second truss 112.

Figure 4:
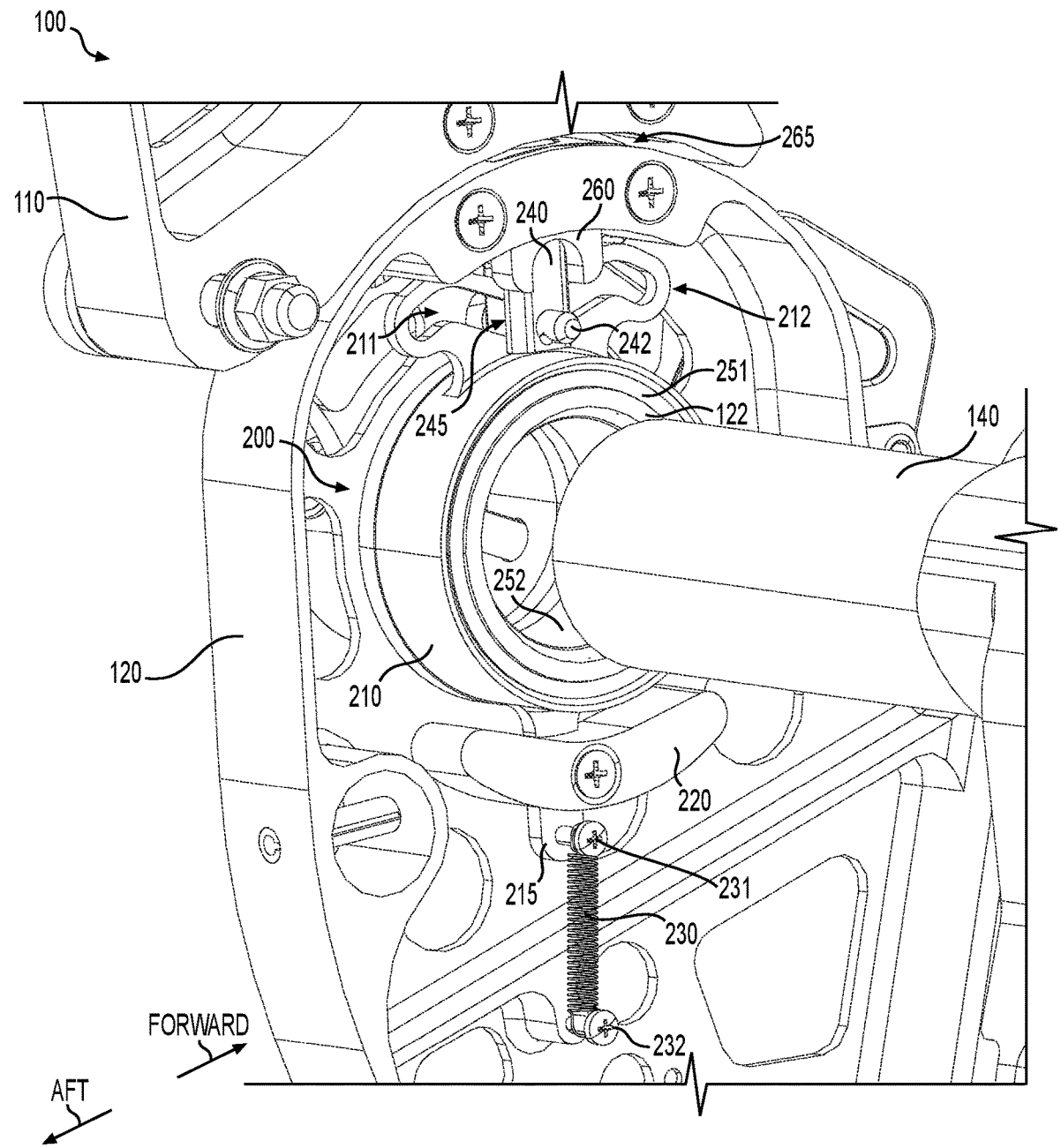
FIG. 4 shows a perspective view of the seat backrest inertial locking system of FIG. 1 in an unlocked orientation.

FIG. 4 shows a perspective view of seat backrest inertial locking system 200 in an unlocked orientation. As depicted in FIG. 4, first bracket 130, support member 150, and seat pan 125 have been removed to enable viewing of underlying components.

Actuator ring 210 is rotatably mounted around a boss 122 that extends from seat base 120. In an embodiment, seat base 120 is a machined aluminum or aluminum-alloy part that includes boss 122. A first bearing 251 is disposed between boss 122 and actuator ring 210 to reduce friction therebetween, which enables facile rotation of actuator ring 210 about boss 122. A second bearing 252 is disposed inside of boss 122 to reduce friction with lug 138 of first bracket 130 during normal operation, thereby maintaining rotational independence between actuator ring 210 and pivot tube 140. First bearing 251 and second bearing 252 are each a plain bearing made of plastic, for example.

Actuator ring 210 includes a central ring portion with appendages including an arm 215 that extends outwardly from an outer surface of actuator ring 210. Located opposite arm 215 is a track that extends outwardly from the outer surface of actuator ring 210 and forms a pair of actuation grooves. The pair of actuation grooves includes a first actuation groove 211 that extends in the aft direction and a second actuation groove 212 that extends in the forward direction, as depicted in FIG. 4. First and second actuation grooves 211, 212 are each configured to receive a pin 242 of a locking member 240. In an embodiment, actuator ring 210, including arm 215 and the track forming first and second actuation grooves 211, 212, is a single part machined from an aluminum block or an aluminum-alloy block (see FIG. 5). Locking member 240 is for example a shaft, beam, bar, arm, pin, or pipe made of metal and having a longitudinal shape. In an embodiment, locking member 240 is made of titanium or a titanium alloy. Pin 242 is for example a detent pin made of metal (e.g., steel) that extends through a hole in locking member 240 and is oriented transversely such that pin 242 is perpendicular to the longitudinal direction of locking member 240. In an embodiment, pin 242 is configured to be removable from locking member 240.

Figure 5:
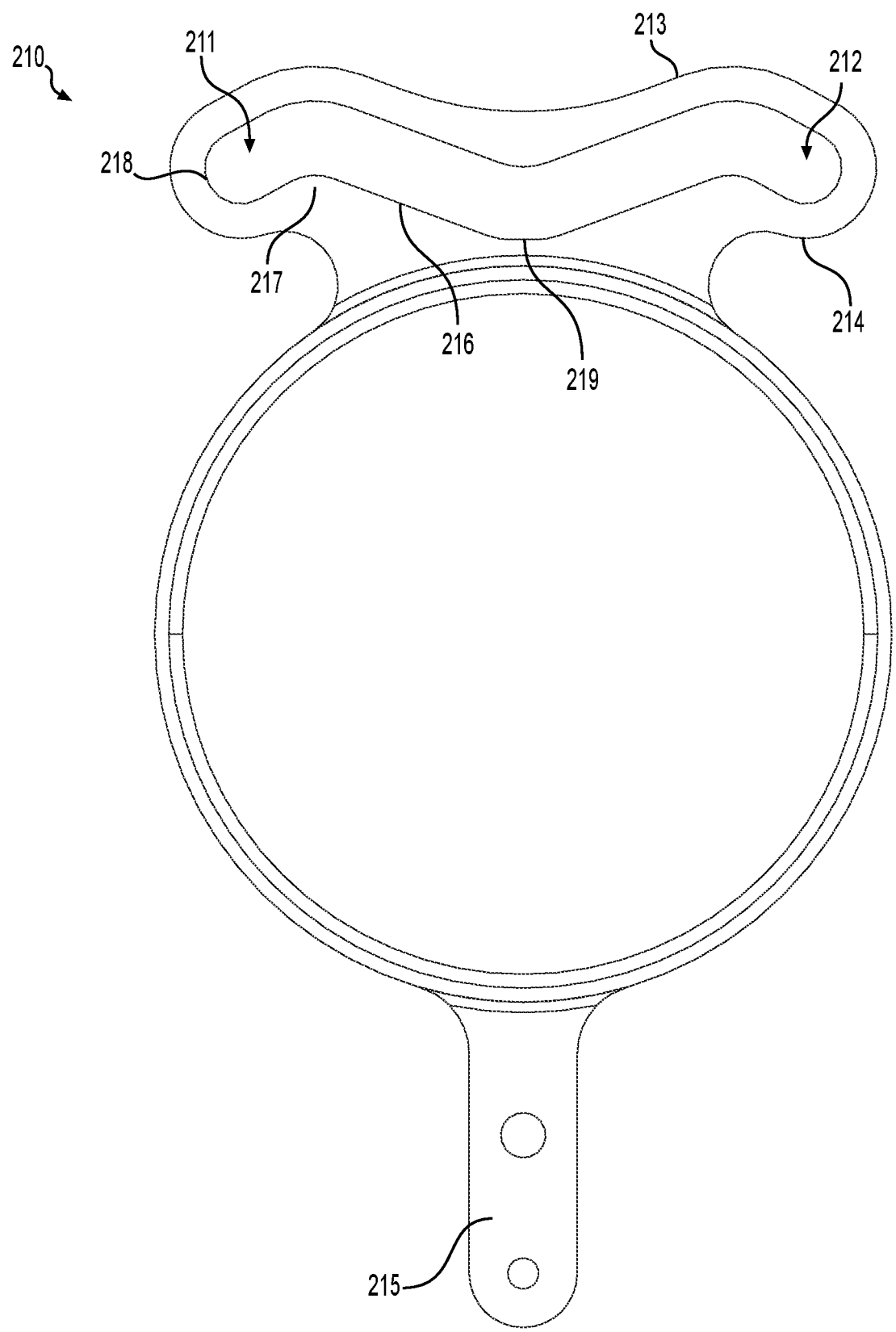
FIG. 5 shows a front view of an actuation ring of the seat backrest inertial locking system of FIG. 1.

FIG. 5 shows a front view of actuator ring 210. First actuation groove 211 and second actuation groove 212 form a track between an upper rail 213 and a lower rail 214. Pin 242 of FIG. 4 is configured to be slidably coupled to the track, such that upper rail 213 and lower rail 214 guide pin 242 as actuator ring 210 rotates. The upper and lower rails 213, 214 are shaped to push locking member 240 longitudinally via pin 242 when actuator ring 210 rotates. For example, when inertial mass 220 moves in the aft direction shown in FIG. 4, actuator ring 210 rotates in a clockwise direction such that first actuation groove 211 moves towards pin 242 and then receives pin 242. As pin 242 follows the shape of first actuation groove 211, pin 242 and locking member 240 are moved upwardly. As shown in FIG. 5, the track's lower rail 214 has an upwardly sloping portion 216 and a curved portion 217. Upper rail 213 and lower rail 214 of the track meet at an end portion 218. As the upwardly sloping portion 216 slides under pin 242, the pin 242 and locking member 240 are moved upwardly. As pin 242 passes the curved portion 217 it is no longer moved upwardly. Movement of actuator ring 210 is arrested when pin 242 reaches the end portion 218 of first actuation groove 211. Second actuation groove 212 is similarly shaped in the opposite direction for actuating locking member 240 via pin 242 due to rapid acceleration of inertial mass 220 in the forward direction, as further described below in connection with FIG. 7. A central dip portion 219 is located in the center of the track between first actuation groove 211 and second actuation groove 212. When pin 242 is located in the central dip portion 219, locking member 240 is lowered into the unlocked orientation, as depicted in FIG. 4.

Returning to FIG. 4, locking member 240, in embodiments, includes a central slot 245 configured to receive upper rail 213 of the track that forms first and second actuation grooves 211, 212. Central slot 245 provides clearance for upper rail 213 to pass through locking member 240 as pin 242 slides in the first actuation groove 211 or the second actuation groove 212.

Inertial mass 220 is mechanically coupled to arm 215. For example, inertial mass 220 may be coupled to arm 215 via a fastener (e.g., a bolt, screw, rivet, bracket, weld, etc.). In some embodiments, rather than coupling inertial mass 220 to arm 215, arm 215 may have a portion opposite its connection to the actuator ring 210 (i.e., the tip of arm 215) that has an increased mass. For example, the tip of arm 215 may comprise a larger size or a different material (e.g., having a higher density), thereby increasing its mass. As depicted in FIG. 4, when system 200 is in an unlocked orientation, arm 215 is oriented substantially vertically and extends beneath actuator ring 210 such that inertial mass 220 is gravitationally balanced beneath a central axis of actuator ring 210. In embodiments, inertial mass 220 weighs between about 0.1-lb to about 0.5-lb. In an embodiment, inertial mass 220 weighs about 0.134-lb. Elastic member 230 is mechanically coupled to arm 215 via a first supporting member 231 and to seat base 120 via a second supporting member 232. Elastic member 230 may comprise any material (e.g., a spring, a rubber material, a plastic material, etc.) that provides an elastic force when stretched. First and second supporting members 231, 232 are for example bolts, screws, or eyelets. In some embodiments, elastic member 230 may be readily exchanged with a different elastic member having different elastic properties. For example, elastic member 230 may be readily removed from first and second supporting members 231, 232 to be replaced. In embodiments where elastic member 230 is a spring, hooks located on the ends of the spring may be removed from the supporting members 231, 232. In embodiments where elastic member 230 is a rubber material, a user may stretch the material to release the elastic member 230 from the supporting members 231, 232. Elastic member 230 provides tension to arm 215 sufficient to prevent unwanted motion of actuator ring 210 during normal aircraft/vehicle operation. However, in the event of a rapid acceleration or deceleration (e.g., due to a crash or emergency maneuver), inertial mass 220 overcomes the tension of elastic member 230, such that elastic member 230 stretches, thereby enabling inertial mass 220 to move forward/aft and rotate actuator ring 210 clockwise/counterclockwise, which pushes locking member 240 upwardly for locking first truss 110, and thereby seat backrest 115 in the upright orientation. In embodiments, elastic member 230 has a spring force between about 0.01-lb and about 0.05-lb. In an embodiment, elastic member 230 has a spring force of about 0.033-lb corresponding to a spring rate of about 0.307-lb/in.

A guide 260 has a slot configured for receiving locking member 240. Specifically, guide 260 is mounted in a hole through seat base 120 and is configured for guiding locking member 240 during movement via actuator ring 210. In an embodiment, guide 260 is made of a material that provides suitable structural integrity and that is compatible with locking member 240 for reducing friction and binding therebetween. For example, guide 260 is made of titanium or a titanium-alloy that is the same or similar to that of locking member 240. A gap 265 provides clearance between first truss 110 and seat base 120 to enable movement of first truss 110 (e.g., when seat backrest 115 is being pivoted back and forth between upright and reclined orientations).

Figure 6:
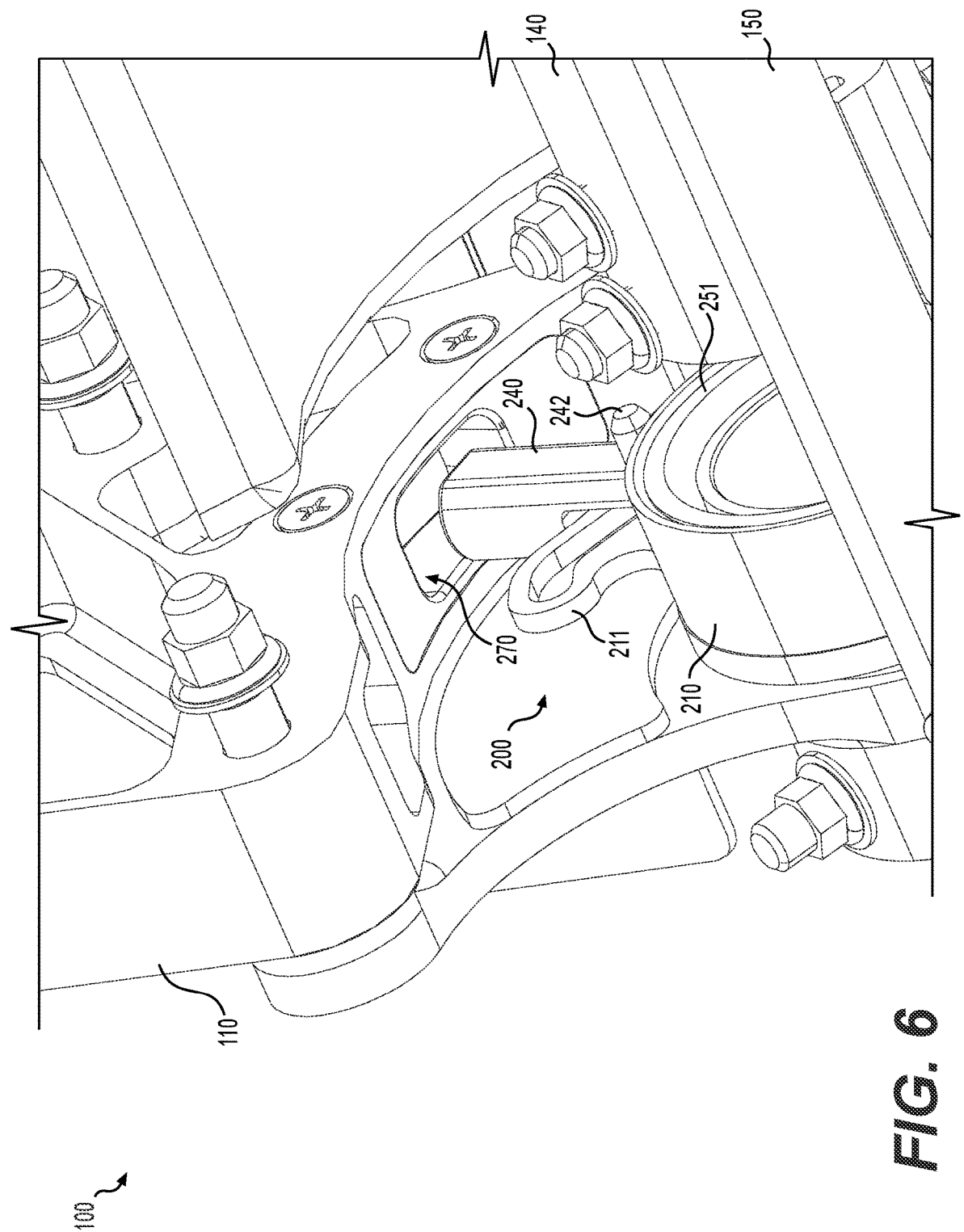
FIG. 6 shows a perspective view of a receiving slot in a seat backrest truss for use with the seat backrest inertial locking system of FIG. 1.

FIG. 6 shows a perspective view of a receiving slot 270 in a bottom end of first truss 110. As depicted in FIG. 6, seat base 120 and guide 260 of FIG. 4 are removed to reveal receiving slot 270. Receiving slot 270 is mounted within an opening in the bottom end of first truss 110. Similar to guide 260, receiving slot 270 is formed of a different material than first truss 110. For example, first truss 110 is formed of an aluminum alloy and receiving slot 270 is formed of a titanium alloy. The material of receiving slot 270 is selected, at least in part, due to its compatibility with the material of locking member 240 so as to reduce friction therebetween when locking member 240 is actuated back and forth between unlocked and locked orientations. The material of locking member 240 is also selected for its strength to maintain structural integrity during use.

As depicted in FIG. 6, seat backrest inertial locking system 200 is in the unlocked orientation such that locking member 240 is withdrawn from receiving slot 270. When seat backrest inertial locking system 200 is in the locked orientation, locking member 240 inserts into receiving slot 270 (see FIG. 7). A size of the opening of receiving slot 270 is configured for receiving locking member 240 while slight movement of first truss 110 is occurring. In other words, the opening of receiving slot 270 is substantially longer than a cross-sectional length of locking member 240 in the forward/aft direction. This enables time for inertial mass 220 to actuate actuator ring 210 and locking member 240 despite movement of first truss 110.

Figure 7:
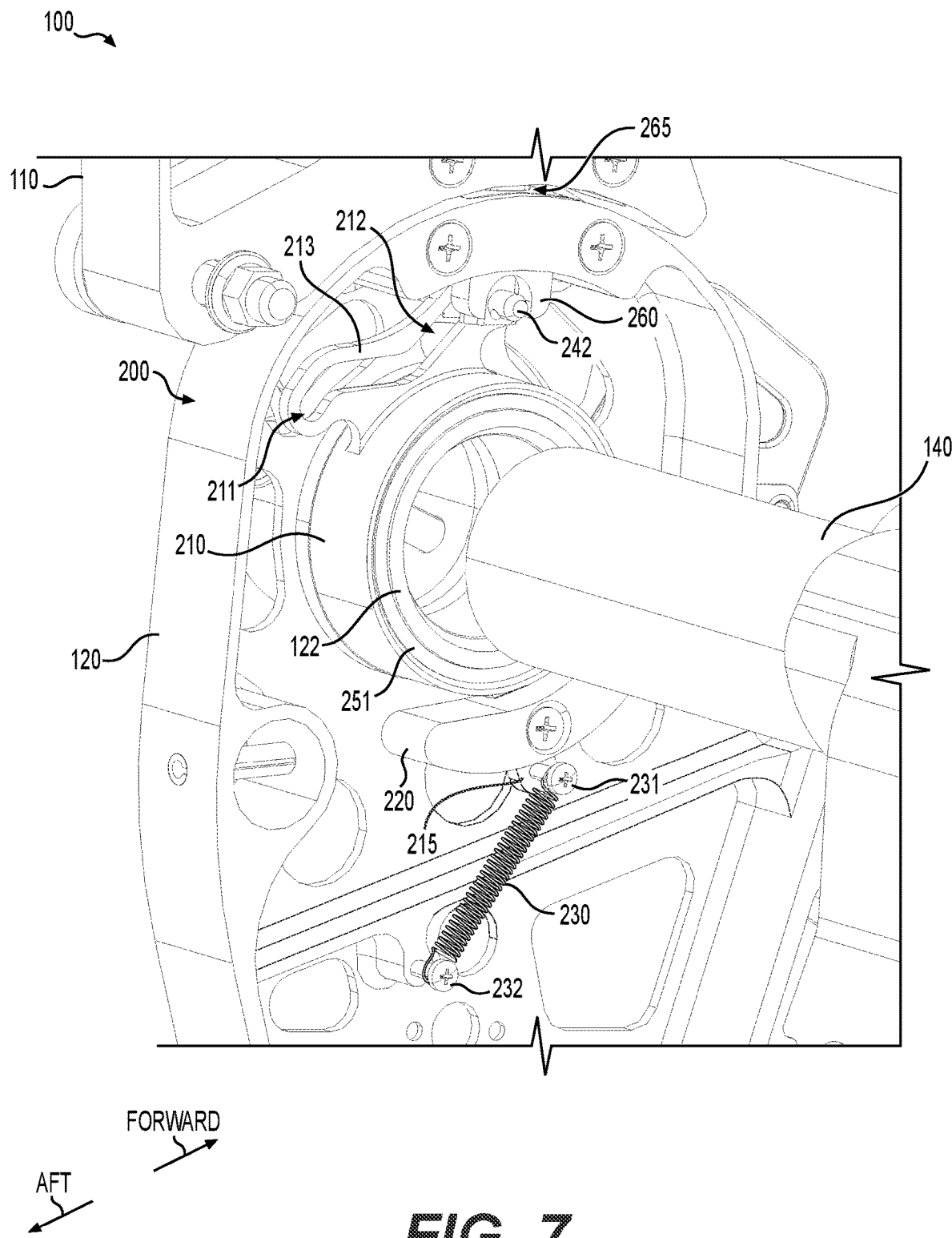
FIG. 7 shows a perspective view of the seat backrest inertial locking system of FIG. 1 in a locked orientation.

FIG. 7 shows a perspective view of seat backrest inertial locking system 200 in a locked orientation. As depicted in FIG. 7, first bracket 130, support member 150, and seat pan 125 have been removed from seat base 120 to enable viewing of underlying components. FIG. 7 is the same as FIG. 4 except that actuator ring 210 has been actuated via forward movement of inertial mass 220 causing the track forming second actuation groove 212 to pivot in the aft direction. The second actuation groove 212 has raised locking member 240 via pin 242 such that locking member 240 is inserted into receiving slot 270 within first truss 110.

In operation, when the aircraft/vehicle is not accelerating or decelerating, seat backrest inertial locking system 200 remains in the unlocked orientation depicted in FIG. 4 in which inertial mass 220 is centered beneath actuator ring 210 via gravity and resistance from elastic member 230. Arm 215 is angled substantially downwardly as depicted in FIG. 4, and pin 242 is centered between first actuation groove 211 and second actuation groove 212 such that pin 242 is located in the central dip portion 219 of lower rail 214 thereby maintaining locking member 240 in the lowered (unlocked) orientation. For example, during takeoff and climb phases of flight while the aircraft is pitched upwardly, inertial mass 220 may move slightly in the aft direction. However, the central dip portion 219 is shaped to allow slight rotation of actuator ring 210 without actuating upward movement of pin 242, thereby avoiding upward movement of locking member 240 to avoid unwanted locking of system 200. Additionally, elastic member 230 is configured to constrain movement of inertial mass 220 to avoid unwanted actuation of locking member 240 via pin 242.

When the aircraft is accelerating or decelerating rapidly, inertial mass 220 moves aft or forward causing rotation of actuator ring 210 thereby raising locking member 240 via pin 242. In certain embodiments, seat backrest inertial locking system 200 is configured for actuation via inertial mass 220 under an acceleration/deceleration of at least 4-G's. In other embodiments, system 200 is configured for actuation under an acceleration/deceleration of at least 5-G's. However, system 200 may be tuned for other acceleration/deceleration levels without departing from the scope hereof. For example, inertial mass 220 may be exchanged with a lighter or heavier mass (e.g., by removing inertial mass 220 from the fastener), and/or elastic member 230 may be exchanged with lighter or heavier members to decrease or increase tension. In another example, the distance between first supporting member 231 and second supporting member 232 may be adjusted to either increase or decrease the tension of elastic member 230. When seat backrest 115 is in the upright orientation, as depicted in FIGS. 1 and 2, receiving slot 270 is aligned with locking member 240 such that locking member 240 is inserted into receiving slot 270. This locks first truss 110 to seat base 120, which maintains seat backrest 115 in the upright orientation.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. An inertial locking system for a seat backrest, comprising:
    an actuator ring rotatably coupled to a seat base, the actuator ring comprising:
        an arm outwardly extending from the actuator ring; and
        a track outwardly extending from the actuator ring, the track having a lower rail and an upper rail forming a groove therebetween;
    an inertial mass mechanically coupled to the arm, the inertial mass configured for moving in a forward direction and an aft direction for rotating the actuator ring;
    a locking member slidably coupled to the track; and
    a receiving slot mounted in an opening of a truss of the seat backrest, the receiving slot configured for receiving the locking member when the actuator ring is actuated via movement of the inertial mass for locking the seat backrest to the seat base.

2. The inertial locking system of claim 1, wherein the groove comprises a first actuation groove extending in the aft direction and a second actuation groove extending in the forward direction, the first actuation groove and the second actuation groove comprising a central dip portion disposed therebetween.

3. The inertial locking system of claim 2, wherein the first actuation groove and the second actuation groove each comprise an upwardly sloping portion configured to slidably actuate the locking member towards the receiving slot upon rotation of the actuator ring.

4. The inertial locking system of claim 1, further comprising an elastic member operatively connected to the arm of the actuator ring at a first end and the seat base at a second end.

5. The inertial locking system of claim 1, wherein the locking member is slidably coupled to the track via a pin extending therethrough.

6. The inertial locking system of claim 1, wherein a portion of the track is received within a central slot defined within the locking member.

7. A seat of a vehicle having a seat backrest inertial locking system configured for locking a seat backrest of the seat in a locked position, the system comprising:
    a pivot tube operatively connected to the seat backrest via a first bracket;
    an actuator ring rotatably coupled to a seat base and receiving a lug of the first bracket, the lug being rotatable therein;
    an inertial mass mechanically coupled to the actuator ring, wherein movement of the inertial mass in a forward direction or an aft direction causes rotation of the actuator ring;
    a locking member operatively coupled to the actuator ring via a pin, the locking member being longitudinally actuated by rotation of the actuator ring; and
    a receiving slot disposed on a portion of the seat backrest, the receiving slot configured for receiving the locking member when longitudinally actuated.

8. The seat of claim 7, wherein the actuator ring comprises an arm and a track extending outwardly therefrom, the track having a lower rail and an upper rail forming a groove therebetween.

9. The seat of claim 8, wherein the inertial mass is mechanically coupled to the arm of the actuator ring.

10. The seat of claim 8, further comprising an elastic member attached at a first end to the arm of the actuator ring via a first supporting member and attached at a second end to the seat base via a second supporting member, the elastic member configured to resist movement of the actuator ring in the forward direction or the aft direction.

11. The seat of claim 10, wherein the elastic member comprises a first elastic member, and further wherein the first elastic member is exchangeable with a second elastic member via the first supporting member and the second supporting member, the second elastic member having a different elasticity than the first elastic member.

12. The seat of claim 7, wherein the inertial mass comprises a first inertial mass, and further wherein the first inertial mass is exchangeable with a second inertial mass via a fastener, the second inertial mass having a different mass than the first inertial mass.

13. The seat of claim 7, wherein the seat backrest inertial locking system comprises an unlocked position, wherein in the unlocked position the seat backrest is freely rotatable about the pivot tube.

14. A seat of a vehicle having an unlocked position and a locked position, the seat comprising:
- a seat base mechanically coupled to the vehicle;
- a seat backrest rotatably connected to the seat base via a pivot tube; and
- a seat backrest inertial locking system configured to prevent rotation of the seat backrest about the pivot tube when actuated, the system comprising:
- an actuator ring receiving a boss extending from the seat base, the actuator ring being rotatable therearound, wherein the actuator ring comprises an arm and a track extending outwardly therefrom;
- an elastic member operatively connected to the arm of the actuator ring at a first end and the seat base at a second end;
- a locking member slidably coupled to the track of the actuator ring,
- wherein rotation of the actuator ring about the boss causes longitudinal movement of the locking member into a portion of the seat backrest, thereby placing the seat in the locked position.

15. The seat of claim 14, wherein the actuator ring comprises an inertial mass on a tip of the arm.

16. The seat of claim 14, further comprising an inertial mass removably coupled to the arm of the actuator ring via a fastener.

17. The seat of claim 14, wherein the seat backrest inertial locking system comprises a first seat backrest inertial locking system, and wherein the seat further comprises a second seat backrest inertial locking system configured to lock the seat backrest.

18. The seat of claim 17, wherein the locking member is slidably coupled to the track of the actuator ring via a pin received within the track, and wherein the track comprises a lower rail and an upper rail forming a groove therebetween, the groove comprising a first actuation groove extending in a first direction and a second actuation groove extending in a second direction.

19. The seat of claim 18, wherein a rapid acceleration of the vehicle causes the arm of the actuator ring to move in the first direction, wherein movement of the arm in the first direction causes the pin to be received within the first actuation groove.

20. The seat of claim 18, wherein a rapid deceleration of the vehicle causes the arm of the actuator ring to move in the second direction, wherein movement of the arm in the second direction causes the pin to be received within the second actuation groove.

\* \* \* \* \*